(12) United States Patent
Hu

(10) Patent No.: US 8,848,498 B2
(45) Date of Patent: Sep. 30, 2014

(54) OPTICAL DISK DRIVE AND START-UP OPERATING METHOD THEREOF

(71) Applicant: Lite-On It Corporation, Taipei (TW)

(72) Inventor: Chih-Yuan Hu, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 13/874,758

(22) Filed: May 1, 2013

(65) Prior Publication Data
US 2014/0160909 A1  Jun. 12, 2014

(30) Foreign Application Priority Data
Dec. 10, 2012  (CN) .......................... 2012 1 0525752

(51) Int. Cl.
*G11B 7/00* (2006.01)
*G11B 19/20* (2006.01)

(52) U.S. Cl.
CPC .................................. *G11B 19/2054* (2013.01)
USPC ..................................................... 369/44.27

(58) Field of Classification Search
None
See application file for complete search history.

(56) References Cited

U.S. PATENT DOCUMENTS

| | | | | |
|---|---|---|---|---|
| 5,602,689 A * | 2/1997 | Kadlec et al. | .............. | 360/78.04 |
| 5,677,899 A * | 10/1997 | Getreuer | ..................... | 369/44.28 |
| 6,636,472 B2 * | 10/2003 | Kurebayashi et al. | ........ | 369/116 |
| 6,651,135 B2 * | 11/2003 | Ando et al. | ..................... | 711/112 |
| 6,901,040 B2 * | 5/2005 | Watt et al. | .................... | 369/47.38 |
| 7,453,773 B2 * | 11/2008 | Jang | ........................... | 369/30.14 |
| 2002/0141300 A1 * | 10/2002 | Hirashima | ................. | 369/44.29 |
| 2005/0243666 A1 * | 11/2005 | Turner et al. | ................. | 369/44.28 |
| 2009/0262006 A1 * | 10/2009 | McNeill et al. | ................. | 342/22 |

* cited by examiner

*Primary Examiner* — Brenda Bernardi
(74) *Attorney, Agent, or Firm* — Rabin & Berdo, P.C.

(57) ABSTRACT

A start-up method of an optical disk drive, comprising: starting to accelerate a spindle motor after initializing a digital signal processor; starting an laser diode driver of an optical pickup head after the spindle motor starts accelerating; and starting a servo control of the optical pickup head. During the step of starting the laser diode driver, the spindle motor is accelerating.

12 Claims, 4 Drawing Sheets

OPTICAL DISK DRIVE AND START-UP OPERATING METHOD THEREOF

This application claims the benefit of People's Republic of China application Serial No. 201210525752.0, filed Dec. 10, 2012, the subject matter of which is incorporated herein by reference.

BACKGROUND OF THE INVENTION

1. Field of the Invention

The invention relates in general to an electrical device, and more particularly to an optical disk drive and start-up operating method thereof.

2. Description of the Related Art

Along with the internet and multimedia industry progress, optical disks for storing audio and video data have replaced old cassettes. Optical disks have a greater data storage capacity than old cassettes, and can preserve the audio and video quality better and longer. Thus, optical disks, such as CD-ROM, DVD-ROM and CD-RW, have become the mainstream of the storage media market today.

Generally, after an idle period, an optical disk drive may enter a power saving mode to reduce the power consumption. At this time, a motor inside the optical disk drive stops, so that the generation of noise and heat can be reduced. Also, part of electronic components on the inside circuit board come to stop working. The power saving mode of the optical disk drive may include Standby mode and/or Sleep mode for example. When a user presses the play button, the optical disk drive will be woken up from the power saving mode and will play the data temporarily stored in a dynamic random access memory (DRAM). Before, the data temporarily stored in the DRAM is played out, the optical disk drive needs to complete a start-up operation, which includes accelerating the rotation speed of a spindle motor to reach the play rotation speed. Therefore, after the data temporarily stored in the DRAM is played out, the optical disc drive can play the data by reading the disc directly.

However, the optical disk drive may use the dynamic random access memory (DRAM) with less memory capacity and the spindle motor with slower acceleration due to manufacturing costs considerations. Accordingly, when the user presses the play button after the power saving mode, since the quantity of data temporarily stored in the DRAM may be insufficient, or the spindle motor with slower acceleration may require longer time to reach the play rotation speed, the optical disc drive may be failed to reach the play rotation speed to read the optical disk data before the data stored in the DRAM has been played out resulting in phenomenon of picture freeze or sound stuttering.

In addition, during the conventional start-up operation, the optical disk drive initializes the inside digital signal processor first. Then, the optical disk drive starts the laser diode driver of the optical pickup head. Next, the optical disk drive starts the motor driving circuit to accelerate the spindle motor, thereby reading the optical disk data. It takes a long time to complete the start-up operation and make the rotation speed of the spindle motor to reach the play rotation speed.

SUMMARY OF THE INVENTION

Accordingly, the invention provides an optical disk drive and a start-up operating method that can efficiently reduce the time for completing the start-up operation and make the rotation speed of the spindle motor to reach the play rotation speed.

According to an aspect of the present invention, a start-up operating method of an optical disk drive is provided. The operating method comprises: starting to accelerate a spindle motor after initializing a digital signal processor; starting an laser diode driver of an optical pickup head after the spindle motor starts accelerating; and starting a servo control of the optical pickup head, wherein during the step of starting the laser diode driver, the spindle motor is accelerating.

According to another aspect of the present invention, an optical disk drive is provided. The optical disk drive comprises an optical pickup head, a digital signal processor, a spindle motor, a servo system, and a control unit. The optical pickup head includes a laser diode driver. The control unit is configured to start to accelerate the spindle motor after initializing the digital signal processor, and start the laser diode driver after the spindle motor starts accelerating, and start a servo control of the optical pickup head, wherein during starting the laser diode driver, the spindle motor is accelerating.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
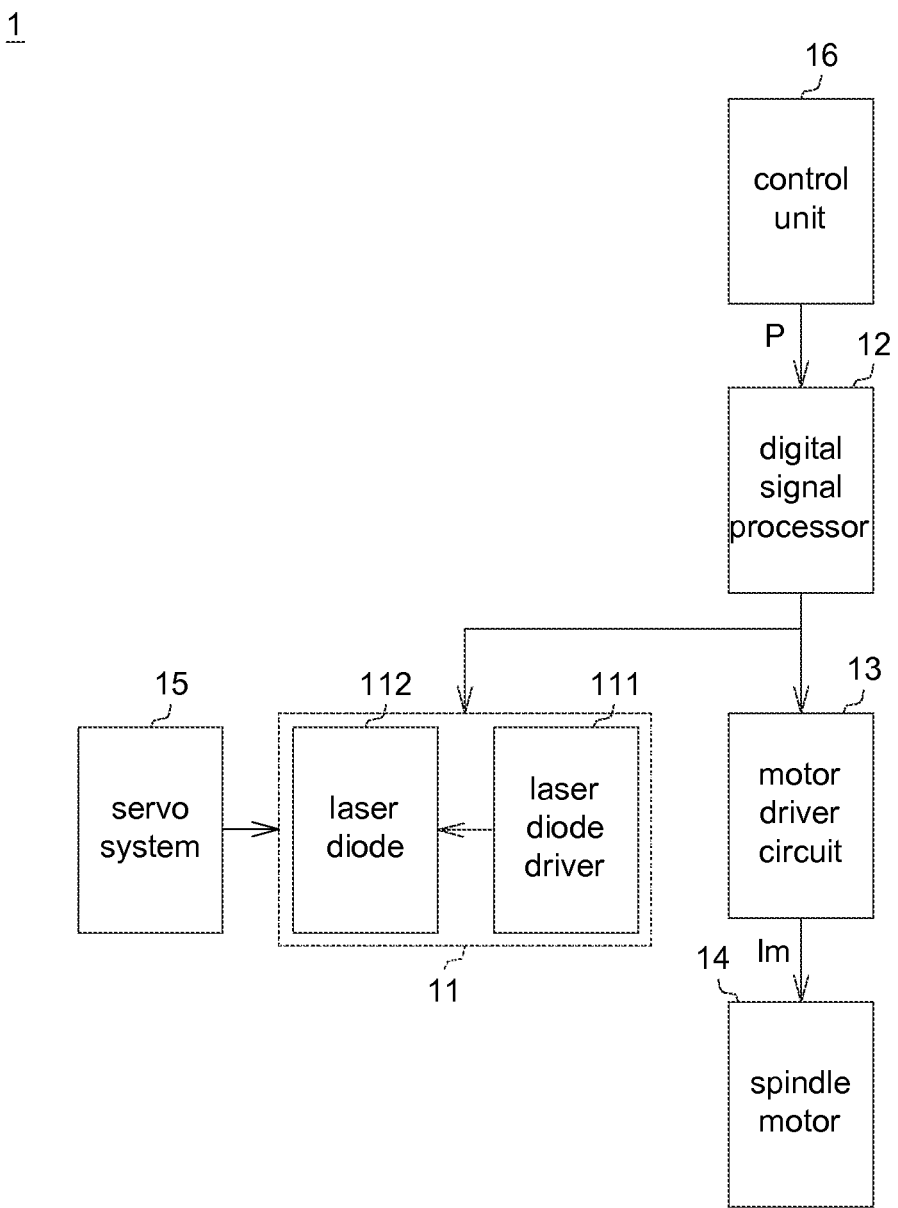
FIG. 1 is a block diagram showing an optical disk drive according to an embodiment of the invention.

FIG. 1 is a block diagram showing an optical disk drive according to an embodiment of the invention. The optical disk drive 1 comprises an optical pickup head 11, a digital signal processor 12, a motor driver circuit 13, a spindle motor 14, a servo system 15 and a control unit 16. The optical pickup head 11 comprises a laser diode driver 111 and a laser diode 112. The laser diode driver 111 drives the laser diode 112 to emit a laser beam. The digital signal processor 12 controls the motor driver circuit 13 to drive the spindle motor 14. The servo system 15 controls the optical pickup head 11 to have a focus and tracking control. The control unit 16 may be, for example, a microcontroller.

Figure 2:
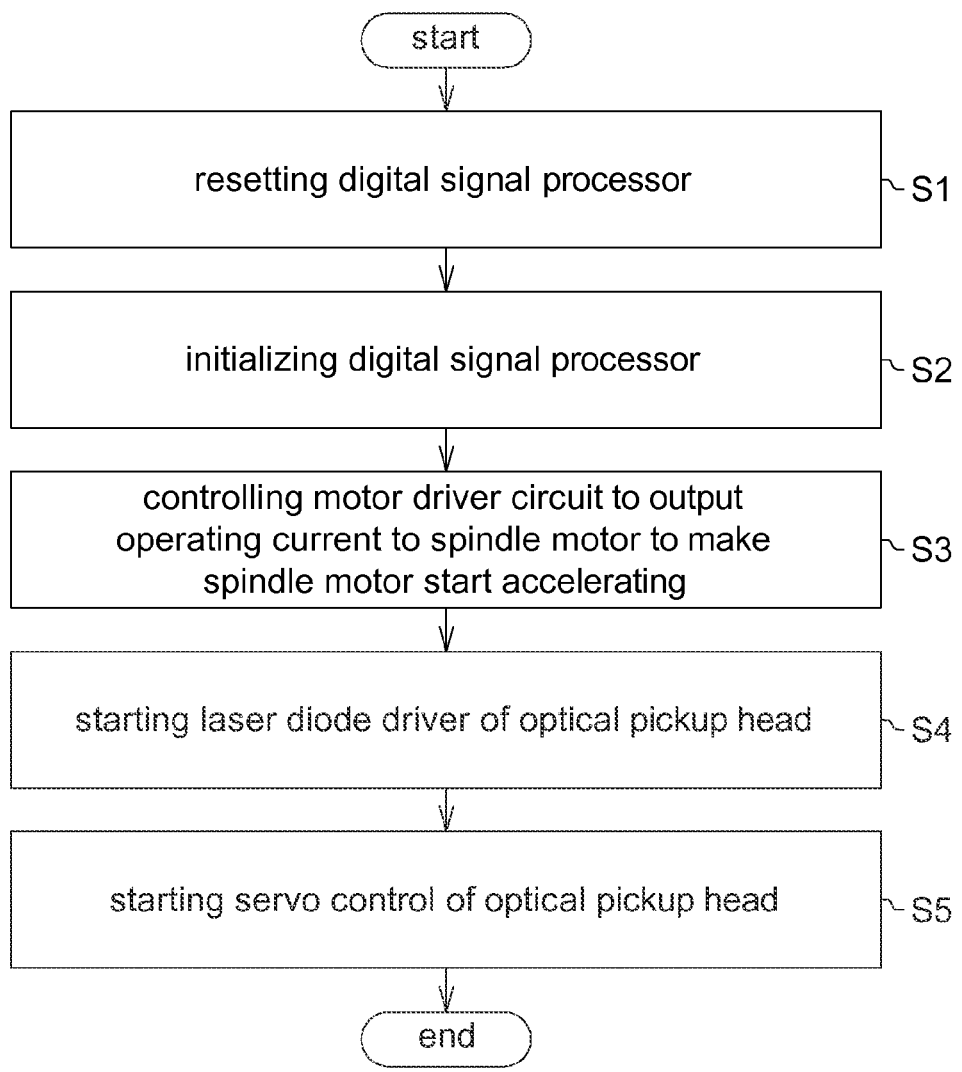
FIG. 2 is a flow chart showing a start-up operating method of an optical disk drive according to a first embodiment of the invention.

Referring to FIGS. 1 and 2. FIG. 2 is a flow chart of a start-up operating method of the optical disk drive according to the first embodiment of the invention. The start-up operating method of the optical disk drive 1 according to the first embodiment comprises steps S1 to S5. The start-up operating method according to the first embodiment may be used at the time of booting start the optical disk drive or at the time of pushing a disk tray into the optical disk drive. First, at step S1, the control unit 16 resets the digital signal processor 12. Next, at step S2, the control unit 16 initializes the digital signal processor 12. After the control unit 16 initializes the digital signal processor 12, step S3 is executed. At step S3, the digital signal processor 12 controls the motor driver circuit 13 to output an operating current Im to the spindle motor 14 to make the spindle motor 14 start accelerating. Then, at step S4, the digital signal processor 12 starts the laser diode driver 112 of the optical pickup head 11 after the spindle motor 14 start accelerating. Next, at step S5, the servo system 15 is controlled to start a servo control of the optical pickup head 11.

It is to be explained that according to the above-mentioned embodiment, the spindle motor 14 starts accelerating after the digital signal processor 12 is initialized. During the process of starting the laser diode driver 112, the spindle motor 14 still continues to accelerate. Besides, if the motor driver circuit 13 is a digital circuit, the digital signal processor 12 can set the operating current, with different levels, of the digital motor driver circuit 13 to increase the output of the operating current to the spindle motor 14. The operating current may be, for example, the maximum operating current which is receivable by the spindle motor 14. Thus, the spindle motor 14 can reach the target rotation speed more quickly to start reading the content of the optical disk.

Figure 3:
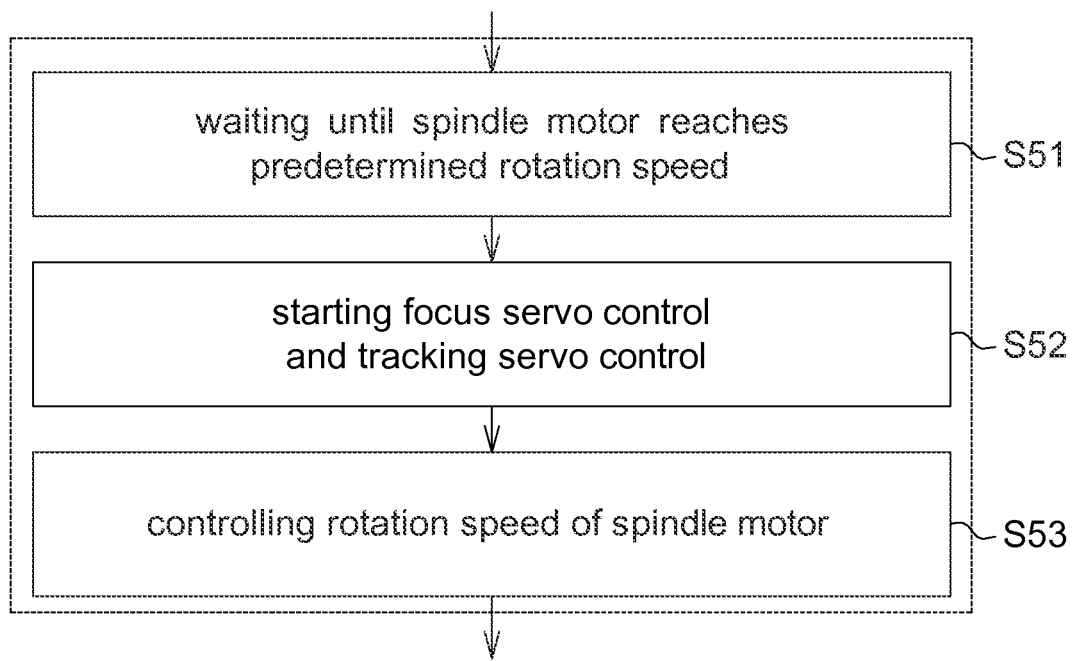
FIG. 3 is a detailed flow chart of step S5.

Referring to FIGS. 1 and 3. FIG. 3 is a detailed flow chart of step S5. In detail, step S5 further comprises steps S51 to step 53. At step 51, the optical disc drive waits until the spindle motor 14 reaches a predetermined rotation speed, wherein the predetermined rotation speed is lower than the target rotation speed. At step 52, after the spindle motor 14 reaches the predetermined rotation speed, the digital signal processor 12 controls the servo system 15 to start a focus servo control and a tracking servo control of the optical pickup head 11. Meanwhile, the motor driver circuit 13 still continues to output the operating current to the spindle motor 14 to make the spindle motor 14 continue to accelerate. At step S53, after finishing the focus servo control and the tracking servo control, the digital signal processor 12 controls the spindle motor 14 to reach the target rotation speed. In other words, the spindle motor 14 is required to reach the predetermined rotation speed before the servo system 15 starts the focus servo control and the tracking servo control. The predetermined rotation speed may be, for example, a rotation speed just required to read the information of a disk. The target rotation speed may be, for example, a rotation speed capable of stably reading the information of the disk under the control of the servo control.

The focus servo control is to use a focus error signal to control the motion of the optical pickup head 11 in the direction perpendicular to the disk, ensuring that the laser beam can be focused on the disk precisely when reading the data, and reaching the required quality of the light spot. The tracking servo control is to keep the light spot of the laser beam on the correct track rather than other tracks, avoiding the occurrence of data read errors.

Second Embodiment

Figure 4:
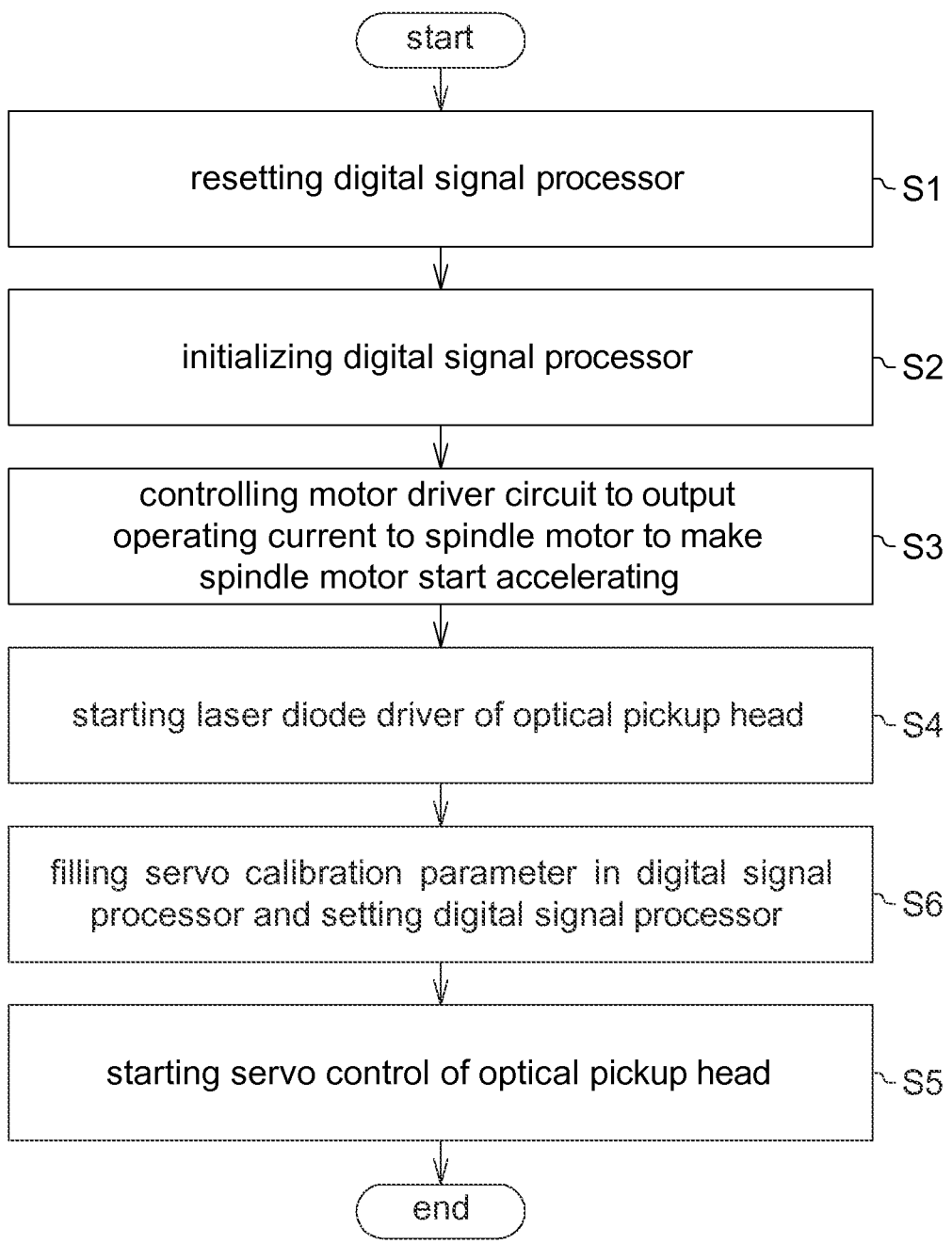
FIG. 4 is a flow chart showing a start-up operating method of an optical disk drive according to a second embodiment of the invention.

Referring to FIGS. 1 and 4. FIG. 4 is a flow chart showing a start-up operating method of an optical disk drive according to the second embodiment of the invention. The main difference between the first and second embodiments is that the operating method of the second embodiment further comprises step S6, and the second embodiment is capable of waking up the optical disk drive from the power saving mode. Step S6 is executed after step S4 that the laser diode driver 112 starts. At step S6, the control unit 16 fills a servo calibration parameter P in the digital signal processor 12, and sets the digital signal processor 12. The servo calibration parameter P may be, for example, a boot-calibrated servo parameter associated with an optical disk and an optical pickup head, etc. The control unit 16 may be, for example, used to set a power management state of the digital signal processor 12. For example, the control unit 16 sets the power management state of the digital signal processor 12 into a normal power supply mode from the power saving mode. After filling the servo calibration parameter P in the digital signal processor 12 and setting the digital signal processor 12, the servo system 15 is controlled to starts a servo control of the optical pickup head 11.

According the first and second embodiments of the invention, after initialing the digital signal processor, the control unit controls the motor driver circuit to output the operating current to the spindle motor to make the spindle motor start to accelerate. Next, the laser diode driver is started. Then, the servo system starts servo control of the optical pickup head. Since the spindle motor starts accelerating after the digital signal processor has initialized, the spindle motor has additional time to accelerate to reach the target rotation speed. Accordingly, it avoids the situation that a spindle motor has to delay a time period to reach the target rotation speed, which is caused by that the spindle motor of a conventional optical disk drive does not start rotating until the last.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A start-up operating method of an optical disk drive, comprising:
   after initializing a digital signal processor, starting to accelerate a spindle motor;
   starting a laser diode driver of an optical pickup head after the spindle motor starts accelerating; and
   starting a servo control of the optical pickup head,
   wherein during the step of starting the laser diode driver, the spindle motor is accelerating, and
   wherein the servo control is started when the spindle motor reaches a predetermined rotation speed.

2. The start-up operating method according to claim 1, further comprising:
   resetting the digital signal processor before initializing the digital signal processor.

3. The start-up operating method according to claim 1, wherein the spindle motor is accelerated until reaching a target rotation speed, wherein the target rotation speed is higher than the predetermined rotation speed.

4. The start-up operating method according to claim 3, wherein the predetermined rotation speed is a rotation speed just required to read the information of a disk, and the target rotation speed is a rotation speed capable of stably reading the information of the disk under the servo control.

5. The start-up operating method according to claim 1, wherein after starting the laser diode driver, the start-up operating method further comprises steps of filling a servo calibration parameter in the digital signal processor and setting the digital signal processor.

6. The operating method according to claim 5, wherein the step of setting the digital signal includes setting a power management state of the digital signal processor.

7. An optical disk drive, comprising:
   an optical pickup head, having a laser diode driver;
   a digital signal processor;
   a spindle motor;
   a servo system; and a control unit, configured to start to accelerate the spindle motor after initializing the digital signal processor, start the laser diode driver after the spindle motor starts accelerating, and start a servo control of the optical pickup head, wherein during starting the laser diode driver, the spindle motor is accelerating, and wherein the servo control is started when the spindle motor reaches a predetermined rotation speed.

8. The optical disk drive according to claim 5, wherein the control unit is further configured to reset the digital signal processor before initializing the digital signal processor.

9. The optical disk drive according to claim 5, wherein the spindle motor is accelerated until reaching a target rotation speed, wherein the target rotation speed is higher than the predetermined rotation speed.

10. The optical disk drive according to claim 9, wherein the predetermined rotation speed is a rotation speed just required to read the information of a disk, and the target rotation speed is a rotation speed capable of stably reading the information of the disk under the servo control.

11. The optical disk drive according to claim 5, wherein after starting the laser diode driver, the control unit is further configured to fill a servo calibration parameter in the digital signal processor and set the digital signal processor.

12. The optical disk drive according to claim 11, wherein the control unit is configured to set a power management state of the digital signal processor.

* * * * *